May 2, 1933. M. G. HIGGINS 1,906,593
SANITATION EQUIPMENT
Filed Sept. 18, 1930   2 Sheets-Sheet 1
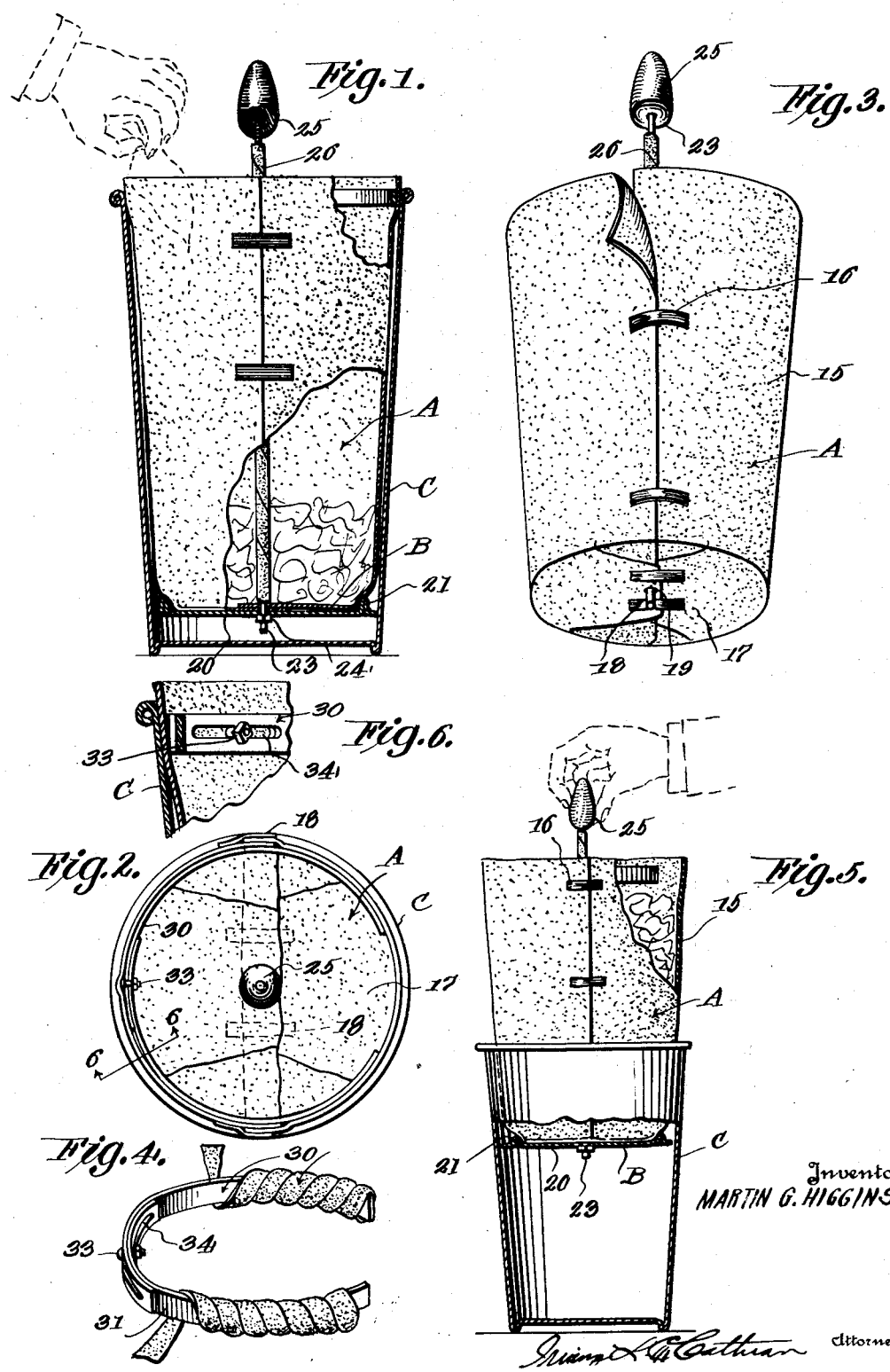
Inventor
MARTIN G. HIGGINS May 2, 1933.  M. G. HIGGINS  1,906,593
SANITATION EQUIPMENT
Filed Sept. 18, 1930   2 Sheets-Sheet 2
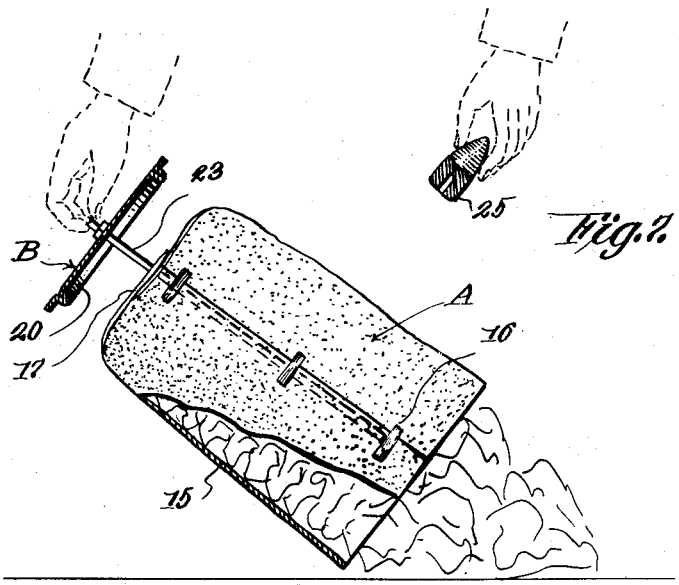
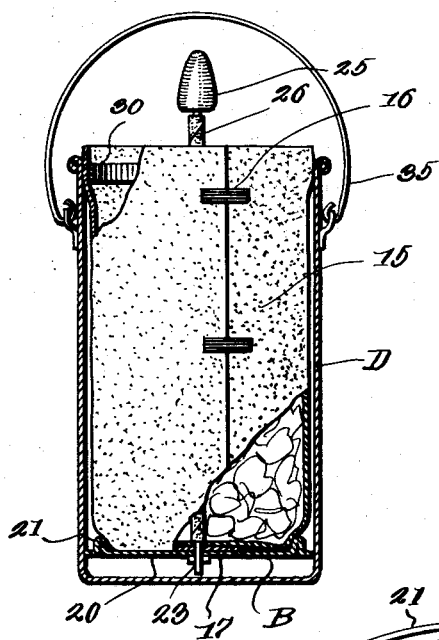
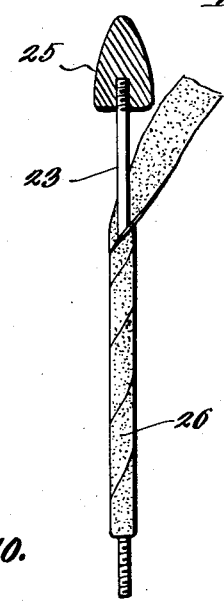
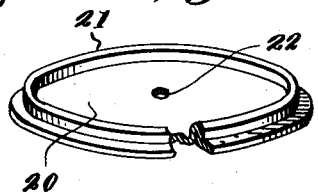
Inventor
MARTIN G. HIGGINS
By
Attorney Patented May 2, 1933

1,906,593

UNITED STATES PATENT OFFICE

MARTIN G. HIGGINS, OF SCRANTON, PENNSYLVANIA

SANITATION EQUIPMENT

Application filed September 18, 1930. Serial No. 482,820.

This invention appertains to waste paper baskets and sanitary cans of the type used in hospitals during operations and for other purposes.

One of the primary objects of my invention is to provide a removable sanitary liner for refuse containers, whereby the liner can be readily and quickly removed when filled with refuse for leaving the container in a clean and sanitary condition, the liner facilitating the handling and disposing of the refuse.

Another important object of my invention is the provision of a novel paper or similar sanitary liner for refuse containers, with novel means for supporting the liner in the container to facilitate the ready removal thereof from the container.

Another important object of my invention is the provision of means whereby the open upper end of the liner can be held in intimate contact with the upper end of the container, so that all the refuse will be directed into the liner and not between the liner and container.

A further salient object of my invention is the provision of a novel device for supporting the paper liner for the container embodying a base plate having a raised annular bead for receiving the lower end of the liner, the base plate being provided with a rod for facilitating the lifting of the base plate and liner out of the container, the rod being also provided with a sanitary wrapping.

A still further object of my invention is to provide an improved device of the above character, which will be durable and efficient in use, one that will be simple and easy to manufacture, and one which can be placed upon the market and incorporated with a conventional waste basket or sanitary hospital can at a small cost.

With these and other objects in view, the invention consists in the novel construction, arrangement and formation of parts as will be hereinafter more specifically described, claimed, and illustrated in the accompanying drawings in which drawings:—

Figure 1 is a vertical section through a waste paper basket showing my improved sanitary liner incorporated therewith, parts of the same being shown broken away and in section.

Figure 2 is a top plan view of my improved liner showing the same incorporated with a waste basket.

Figure 3 is a detail perspective view of the improved liner showing the same removed from the waste basket.

Figure 4 is a detail perspective view of the spring clamp utilized for holding the liner against the side wall of the waste paper basket or other container.

Figure 5 is a view similar to Figure 1 showing the liner being removed from the waste basket or other container.

Figure 6 is a fragmentary sectional view taken on the line 6—6 of Fig. 2.

Figure 7 is a detail perspective view showing the liner being removed from the holder.

Figure 8 is a vertical sectional view showing my improved liner incorporated with the sanitary hospital can.

Figure 9 is a detail view of the handle and manipulating rod, the handle being shown in section, the view illustrating the sanitary covering for the rod.

Figure 10 is a detail perspective view of the base of the holder upon which the liner rests.

Referring to the drawings in detail, wherein similar reference characters designate corresponding parts throughout the several views, the letter A generally indicates my improved sanitary liner and B the holder therefor.

In Figures 1, 5, and 6, I have illustrated the liner and holder incorporated with a conventional waste paper basket C, while in Figure 8 I have shown the improved liner A and holder B incorporated with a conventional hospital can D.

My improved liner A is preferably constructed from paper and can be rolled around a suitable form to provide a substantially cylindrical side wall 15, the edges of which are brought in overlapping relation and secured together by adhesive tape or the like 16. The ends of the side walls at the bottom are folded over in overlapping relation to provide the bottom wall 17, and the folded over portions are secured together by strips of adhesive tape or the like 18. An axially disposed opening 19 can be formed in the bottom wall 17, for a purpose, which will be later described.

The improved holder B comprises a base plate 20, preferably formed of sheet metal and of a size to fit within the waste paper basket C or the sanitary hospital can D, as the case may be. This base plate 20 adjacent to but spaced from its periphery is provided with an upstruck annular rib 21, which forms a seat for receiving the lower end of the liner A. The axial center of the base plate 20 can be provided with a threaded hole or opening 22 for receiving the lower threaded end of the manipulating rod 23. This rod is adapted to be passed through the opening 19 of the sanitary liner A and through the opening 22 of the base plate 20, after which a nut can be placed upon the end of said rod, as indicated by the reference character 24. This rod is of such a length as to extend beyond the waste paper basket C and the liner A and its upper end can be threaded for the reception of a suitable handle 25.

In order to protect the rod and to make all parts sanitary, a paper strip 26 is to be wound about the rod as clearly shown in Figure 9 of the drawings. The ends of the strip 26 can be held securely in place in any desired way, such as by the use of adhesive or like tape.

After the liner has been placed within the waste basket C or the sanitary hospital can D, as the case may be, a resilient clamp 30 is placed in the liner and adjacent to the upper end thereof so as to normally urge the liner into frictional contact with the waste paper basket C or can D in order to hold the liner against collapsing.

This resilient clamp 30 may comprise a pair of like substantially semi-circular spring bands 31, the ends of which can be brought into overlapping relation as clearly shown in Figure 4. The overlapping ends can be provided with slots 32, through which extends the holding bolt and nut 33. By this construction the active size of the spring clamp can be adjusted.

After the sanitary liner has become filled with the refuse, the handle 25 can be grasped by the attendant as shown in Figure 5 of the drawings and the liner and its holder pulled from out of the waste paper basket or can as the case may be. The liner together with the refuse can be pulled off the rod as shown in Figure 7 of the drawings and a new liner can be substituted therefor, and the device again placed in the waste paper basket or can.

The resilient clamp 30 can also be covered with sanitary tissue or other paper to protect the same when in use. This paper can be burned with the refuse and new paper wound about the same when the clamp is again brought into play.

My device is particularly adapted for use in connection with cans, such as is used in hospitals and insures that these cans will be kept in a sanitary condition at all times. It is to be understood, however, that my invention is not limited to hospital cans alone, as the same can be used to great advantage in all types of refuse or other containers of cylindrical or tubular form. These cans can be provided with ordinary covers, if so desired, and are provided with bail carrying handles 35, as clearly shown in Figure 8.

My device is particularly adapted for use in the operating rooms of hospitals for receiving bandages, medicated cotton, and the like, and should the container become filled during an operation, the liner can be removed from the can and the can used without the liner for further reception of the waste material.

Likewise my device is particularly adapted to all isolated wards or rooms in hospitals or elsewhere, for surgical and medical wards, for surgical and medical clinics, and also for doctors' private dressing and examination rooms. It is also adapted to meet the requirements of public health regulations in public buildings and the like, where refuse cans or waste paper baskets are used, thus being a protection to the tenants and the public by preventing of the spreading of infection through germ laden dressings; as the inner lining and its contents are burned after their removal.

Changes in details may be made without departing from the spirit or the scope of this invention, but:—

What I claim as new is:

1. A device of the class described comprising a base plate having a flange formed near the peripheral edge thereof, a removable sanitary body seated upon said base plate and against said flange, a wrapped expansible clamp fitting snugly against the inner face of said body adjacent the upper edge thereof for constituting means for maintaining the shape of said body, a manipulating rod passing down through said body and detachably engaging said base plate, and a removable wrapper extending throughout the entire length of said manipulating rod.

2. A device of the class described comprising a sanitary paper body formed of a tubular structure having a closed bottom and an open upper end, a base plate for supporting said bottom, an adjustable open ended expansible clamping member fitting snugly against the inner face of said body adjacent the outer end thereof for maintaining said body in its shape, a removable manipulating rod engaging said base plate and extending throughout the length of said sanitary paper body, a sanitary wrapper extending throughout the entire length of said rod and removable longitudinally thereof, and a removable handle carried by said rod for holding said wrapping on said rod in position.

3. A device of the class described comprising a base plate, a sanitary paper body formed of a tubular structure having a closed bottom and an open upper end, said base plate provided with a flat upper face having a retaining flange around the periphery thereof, said bottom fitting flat upon said upper face of said base plate and a removable manipulating rod extending longitudinally of the sanitary paper body and passing through said bottom and engaging said base plate and projecting below the base plate to support said base plate above the bottom of a container, and a sanitary wrapper extending around and throughout the length of said rod.

4. A device of the class described comprising a base plate, a removable sanitary body having a bottom seated flat upon said base plate, a wrapped expansible clamp fitting snugly against the inner face of said body adjacent the upper edge thereof for constituting means for maintaining the shape of said body, said expansible clamp having free expansible ends and a manipulating rod passing down through said body and detachably engaging said base plate and projecting below the base plate to support said base plate above the bottom of a container, and a removable wrapper extending throughout the entire length of said manipulating rod.

In testimony whereof I affix my signature.

MARTIN G. HIGGINS.